US 11,144,969 B2

(12) United States Patent
Brown

(10) Patent No.: US 11,144,969 B2
(45) Date of Patent: Oct. 12, 2021

(54) SEARCH RESULT CONTENT SEQUENCING

(75) Inventor: Tom Brown, West Chester, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 845 days.

(21) Appl. No.: 12/510,733

(22) Filed: Jul. 28, 2009

(65) Prior Publication Data
US 2011/0029392 A1 Feb. 3, 2011

(51) Int. Cl.
G06Q 30/00 (2012.01)
G06Q 30/02 (2012.01)
G06F 16/438 (2019.01)
G06F 16/48 (2019.01)
G06F 16/435 (2019.01)

(52) U.S. Cl.
CPC ....... *G06Q 30/0277* (2013.01); *G06F 16/435* (2019.01); *G06F 16/4387* (2019.01); *G06F 16/489* (2019.01)

(58) Field of Classification Search
CPC ........... G06Q 30/0277; G06F 16/4387; G06F 16/489; G06F 16/435
See application file for complete search history.

(56) References Cited

U.S. PATENT DOCUMENTS

| 6,189,008 | B1 | 2/2001 | Easty et al. |
| 6,505,169 | B1* | 1/2003 | Bhagavath et al. ....... 705/14.66 |
| 6,564,380 | B1* | 5/2003 | Murphy ................. H04N 7/147 348/207.11 |
| 6,571,279 | B1 | 5/2003 | Herz et al. |
| 6,651,141 | B2* | 11/2003 | Adrangi ......................... 711/118 |
| 6,757,277 | B1* | 6/2004 | Shaffer ................. H04L 1/0014 370/356 |
| 6,853,982 | B2 | 2/2005 | Smith et al. |
| 7,299,275 | B2* | 11/2007 | Tsukidate et al. ............ 709/223 |

(Continued)

FOREIGN PATENT DOCUMENTS

| CA | 2710121 | 7/2010 |
| EP | 2063598 A1 | 5/2009 |
| EP | 10170130.8 | 7/2010 |

OTHER PUBLICATIONS

Songoing Chen et al., "Sproxy: A Caching Infrastructure to Support Internet Streaming," IEEE Transactions on Multimedia, vol. 9, No. 5, Aug. 1, 2007, pp. 1062-1072.

(Continued)

*Primary Examiner* — Yehdega Retta
(74) *Attorney, Agent, or Firm* — Banner & Witcoff, Ltd.

(57) ABSTRACT

Systems and methods for generating and receiving a sequenced listing of pieces of content are described. A request to search for assets may be received. A first listing of assets associated with the request may be received. Data representative of assets stored within an edge server associated with the user may be received. A first group of assets of the first listing of assets that are stored within the edge server based upon the received data representative of assets stored within the edge server and a second group of assets of the first listing of assets that are not stored within the edge server based upon the received data representative of assets stored within the edge server may be determined. A second listing of assets may be generated where at least one asset of the first group is sequenced separate from at least one asset of the second group.

20 Claims, 9 Drawing Sheets

(56) References Cited

U.S. PATENT DOCUMENTS

| | | | |
|---|---|---|---|
| 7,787,818 B2 | 8/2010 | Shapiro et al. | |
| 7,912,458 B2 | 3/2011 | Ramer et al. | |
| 7,991,841 B2 | 8/2011 | Anderson et al. | |
| 8,050,675 B2 | 11/2011 | Ramer et al. | |
| 8,060,398 B2 | 11/2011 | Canning et al. | |
| 8,073,741 B2 | 12/2011 | Blumenthal et al. | |
| 8,255,457 B2 | 8/2012 | Turner et al. | |
| 8,806,531 B1 | 8/2014 | Ho et al. | |
| 8,863,204 B2 | 10/2014 | Whyte et al. | |
| 8,892,591 B1 | 11/2014 | Haugen et al. | |
| 2002/0156783 A1* | 10/2002 | Schwartz et al. | 707/9 |
| 2003/0005457 A1 | 1/2003 | Faibish et al. | |
| 2004/0010588 A1* | 1/2004 | Slater | H04L 29/06027 709/224 |
| 2004/0064832 A1* | 4/2004 | Tsukidate | H04N 7/17354 725/14 |
| 2004/0103437 A1 | 5/2004 | Allegrezza et al. | |
| 2004/0254851 A1 | 12/2004 | Himeno et al. | |
| 2005/0117853 A1 | 6/2005 | Murali et al. | |
| 2005/0149500 A1 | 7/2005 | Marmaros et al. | |
| 2005/0262245 A1 | 11/2005 | Menon et al. | |
| 2006/0206912 A1* | 9/2006 | Klarfeld et al. | 725/40 |
| 2006/0271972 A1 | 11/2006 | Pai et al. | |
| 2008/0228821 A1 | 9/2008 | Mick et al. | |
| 2008/0270579 A1 | 10/2008 | Herz et al. | |
| 2009/0083279 A1 | 3/2009 | Hasek | |
| 2009/0163183 A1 | 6/2009 | O'Donoghue et al. | |
| 2010/0121940 A1 | 5/2010 | Reeser | |
| 2010/0146038 A1 | 6/2010 | Hajiaghayi et al. | |
| 2010/0192175 A1 | 7/2010 | Bachet et al. | |
| 2010/0250772 A1 | 9/2010 | Mao | |
| 2010/0281509 A1* | 11/2010 | Yu | H04N 7/17336 725/100 |
| 2011/0035441 A1* | 2/2011 | Osuga | H04L 67/2842 709/203 |
| 2011/0061077 A1 | 3/2011 | Georgis et al. | |
| 2011/0131341 A1 | 6/2011 | Yoo et al. | |
| 2011/0191802 A1 | 8/2011 | Haberman et al. | |
| 2011/0241882 A1 | 10/2011 | Gonzales et al. | |
| 2011/0275353 A1 | 11/2011 | Liu | |
| 2011/0282888 A1 | 11/2011 | Koperski et al. | |
| 2011/0289139 A1 | 11/2011 | McIntosh et al. | |
| 2011/0307478 A1 | 12/2011 | Pinckney et al. | |
| 2012/0159558 A1 | 6/2012 | Whyte et al. | |
| 2013/0144750 A1 | 6/2013 | Brown | |
| 2014/0149533 A1 | 5/2014 | Bergman et al. | |

OTHER PUBLICATIONS

Agarwal, "Intelligent content caching for mobile devices," Deutsche Telekom AG, Laboratories, May 2006, pp. 1-4.
Canali et al., "Content Delivery and Management," 2008, pp. 1-22.
Pathan, "Utility-Oriented Internetworking of Content Delivery Networks," Department of Computer Science and Software Engineering, The University of Melbourne, Australia, Nov. 2009, pp. 1-203.
Qasim et al., "A Partial-Order Based Active Cache for Recommender Systems," 2009, pp. 1-4.
Canadian Office Action—CA Appl. 2,710,121—dated Jun. 15, 2016.
European Office Action—EP 10170130.8—dated Sep. 8, 2015.
Response to EP Office Action—EP App 10170130.8—Filed Jan. 18, 2016.
May 10, 2017—Canadian Office Action—CA 2,710,121.
Apr. 17, 2018—Canadian Office Action—CA 2,710,121.
May 24, 2018—European Decision to Refuse—EP 10170130.8.
Apr. 2, 2019—Canadian Office Action—CA 2,710,121.
Mar. 13, 2020—Canadian Office Action—CA 2,710,121.

\* cited by examiner

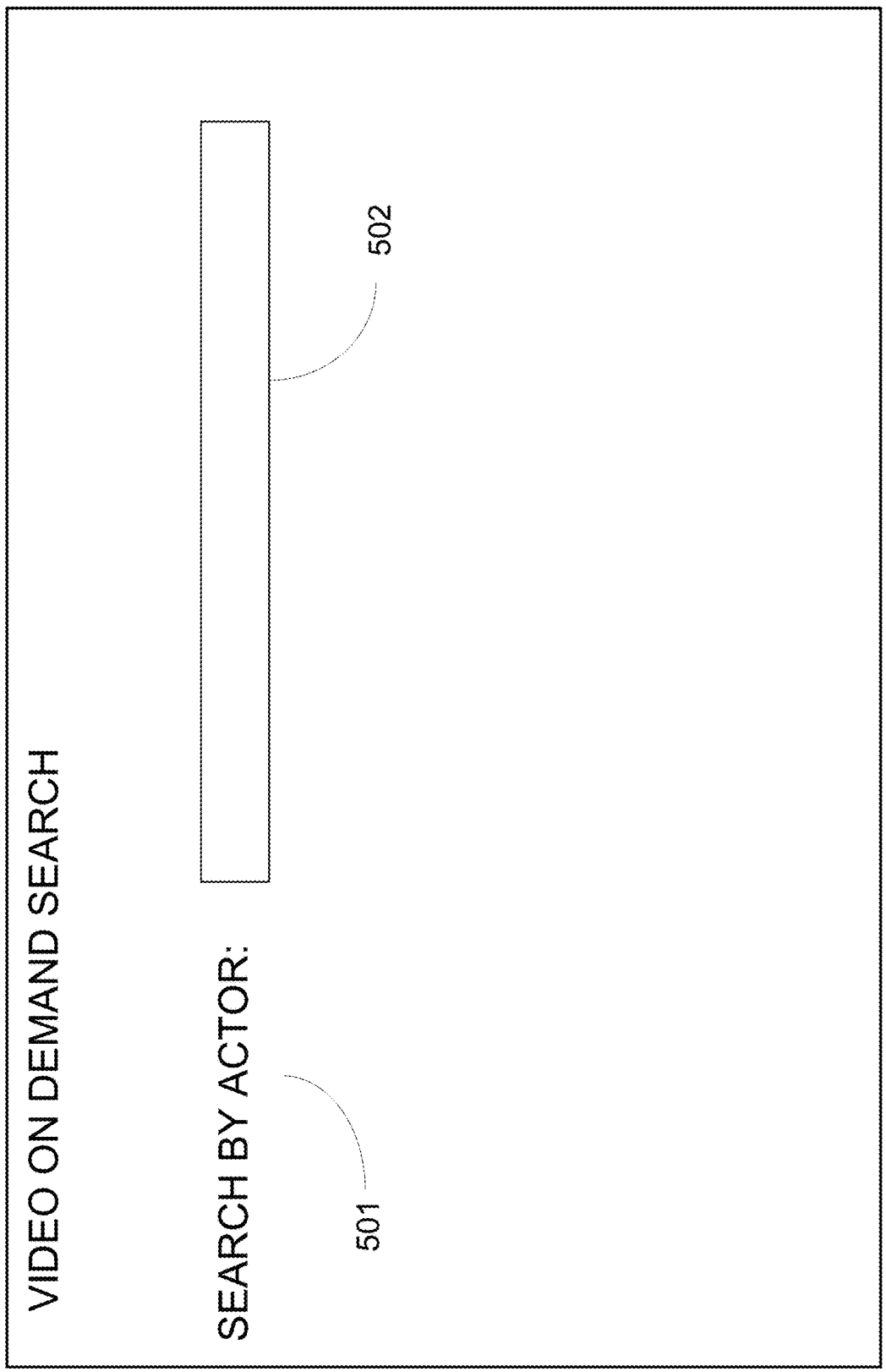

VIDEO ON DEMAND SEARCH — 501

SEARCH BY ACTOR: Bruce Willis — 502

MOVIES: — 503
- Live Free or Die Har
- Grindhouse
- Over the Hedge
- Die Hard
- The Whole Nine Yar TV: — 504
- Moonlighting
- That 70's Show
- Friends
- True West
- Miami Vice OTHER: — 505
- Song: Respect Your
- Song: Under the Bo
- Song: Young Blood
- Song: Secret Agent
- Song: Comin' Right

Fig. 5B

SEARCH RESULT CONTENT SEQUENCING

BACKGROUND

As the Internet and other content distribution systems have expanded, support systems for handling the ever increasing amount of content have been forced to attempt to maintain as best a user experience as possible. In the home entertainment industry, content providers, such as cable companies, want to make the user experience as enjoyable for the end customers as possible in order to ensure retention. As new potential content that a customer may want to see becomes available, the underlying systems to store and maintain that content have to increase.

When seeking content, a user can seek a specific piece of content, such as a specific movie, but she often wants to search for something by type, genre, specific actor, release date, or some other criteria. In the example of video-on-demand, today there are millions of options for a user. When taking into account movies, TV shows, songs, and games, a user must drill down many levels to potentially get to a desired piece of content. Conventional methods for sequencing search results focus on managing the list of individual pieces of content independent of the cost and resources required to deliver the content to the consumer. As content increases, the cost behind making that content available increases as well.

Conventional solutions assume that each content selection is equally available and therefore interchangeable in the consumer experience. This is not true in a multi tiered delivery architecture, leaving the possibility that consumers will make selections without full knowledge of the impact on the overall viewing experience.

SUMMARY

In light of the foregoing background, the following presents a simplified summary of the present disclosure in order to provide a basic understanding of some features of the disclosure. This summary is provided to introduce a selection of concepts in a simplified form that are further described below. This summary is not intended to identify key features or essential features of the disclosure.

Systems and methods for generating and receiving a sequenced listing of pieces of content are described. A request to search for assets may be received. A first listing of assets associated with the request may be received. Data representative of assets stored within an edge server associated with the user may be received. A first group of assets of the first listing of assets that are stored within the edge server based upon the received data representative of assets stored within the edge server and a second group of assets of the first listing of assets that are not stored within the edge server based upon the received data representative of assets stored within the edge server may be determined. A second listing of assets may be generated where at least one asset of the first group of assets is sequenced separate from at least one asset of the second group of assets.

BRIEF DESCRIPTION OF THE DRAWINGS

Some embodiments of the present disclosure are illustrated by way of example, and not by way of limitation, in the figures of the accompanying drawings and in which like reference numerals refer to similar elements.

FIGS. 5A-5C are illustrative user interfaces of a sequenced content delivery system in accordance with one or more features of the disclosure herein.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

The disclosure is operational with numerous general purpose or special purpose computing system environments or configurations. Examples of well known computing systems, environments, and/or configurations that may be suitable for use with features described herein include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The features may be described in the general context of computer-executable instructions, such as program modules, being executed by a computer. Generally, program modules include routines, programs, objects, components, data structures, etc. that perform particular tasks or implement particular abstract data types. Features herein may also be practiced in distributed computing environments where tasks are performed by remote processing devices that are linked through a communications network. In a distributed computing environment, program modules may be located in both local and remote computer storage media including memory storage devices.

Figure 1A:
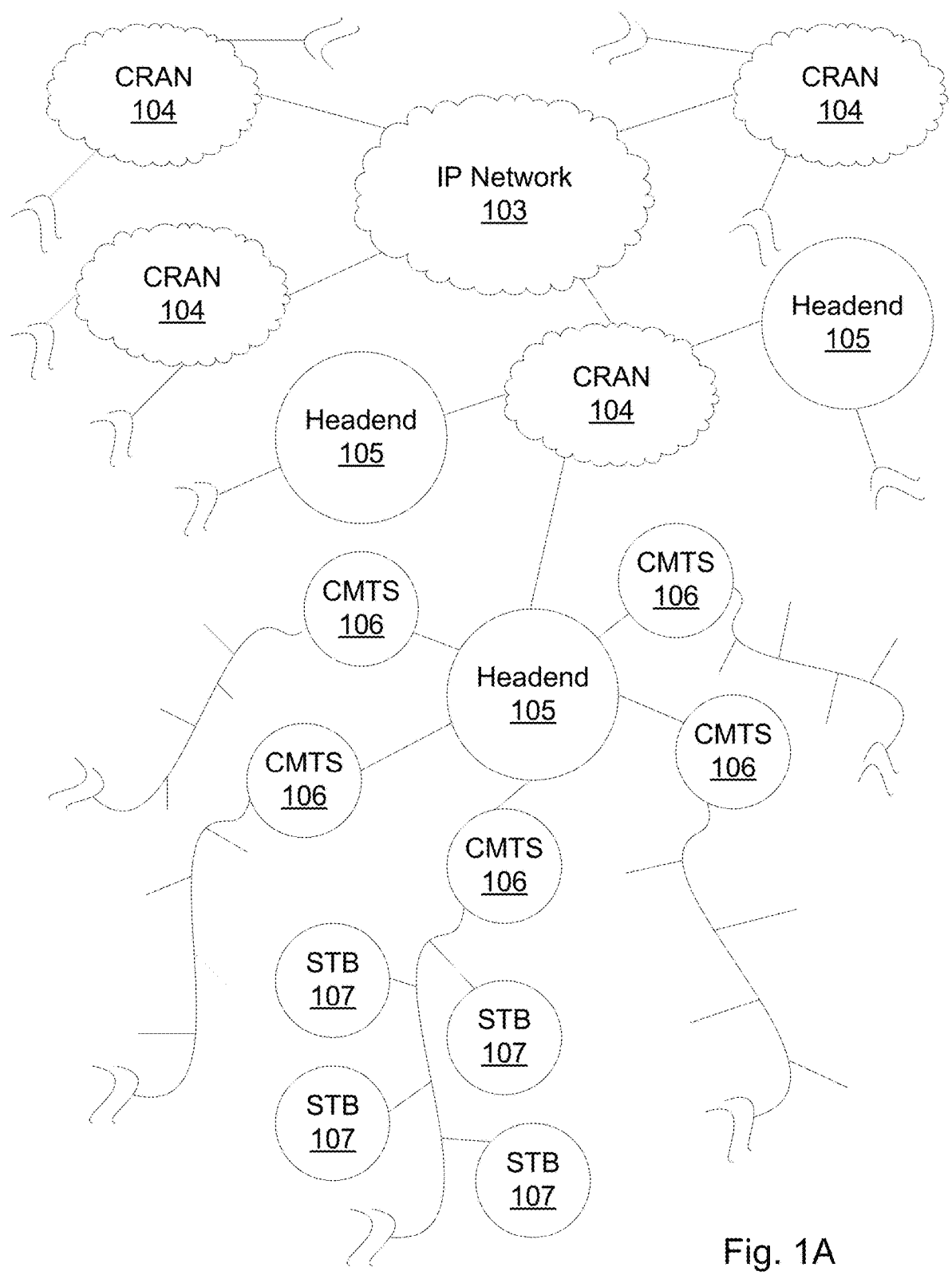
FIG. 1A is an illustrative schematic of a content delivery network in accordance with one or more features of the disclosure herein.

FIG. 1A shows an illustrative schematic of a content delivery network in accordance with one or more features of the disclosure. Throughout this disclosure, reference is made to a cable system embodiment of a network; however, it should be understood the systems and methods of the disclosure are not limited to a cable system and may include any content delivery network, e.g., Internet-based systems, wireless systems, and fiber-based systems. As used herein, a content delivery network or content distribution network ("CDN") is a system of computers networked together that cooperate to deliver content to end users or subscribers.

Referring to FIG. 1A, the network comprises an IP network (backbone) 103. IP network 103 may comprise a large collection of interconnected, high-capacity data routes and core routers. Networked to IP network 103 may be a plurality of subnetworks 104, which, in a cable system may include Converged Regional Area Networks (CRAN), which typically, although not necessarily, service certain geographic regions. Each subnetwork (CRAN) 104 may be associated with one or more edge router 106 for communicating with a plurality of clients 107 in the network. In a cable system, the edge router 106 may be a cable modem termination system (CMTS) 106. CMTS 106 typically resides in a cable company's headend 105, or hubsite, and is used to provide high speed data services, such as cable internet or Voice over IP, to cable subscribers via a client device 107, such as a set top box (STB) or Cable Modem (CM). A given headend 105 may have between half a dozen to a dozen or more CMTSs to service the cable modem population served by that headend or hybrid fiber coax (HFC) hub. On the subscriber side of the headend, CMTS 106 enables the communication with subscribers' cable modems. To this end, CMTS 106 functions not only to route signals to various clients (set top boxes) 107, but also to convert a signal used at the backbone 103 level to a form suitable for the clients. Specifically, the CMTS 106 may interface Ethernet interfaces (connections) on one side and coax RF interfaces on the other side. The RF/coax interfaces carry RF signals to and from the subscriber's client device.

In a cable system, the client device is often referred to as a set top box (STB). A modem may be an IP device associated with the client device and the STB may be a client video device. A STB (e.g., set top box 107) refers to a device that connects to a monitor and an external source of signal, converting the signal into content for display/transmission over the monitor. The signal source might be an Ethernet cable, a satellite dish, a coaxial cable (cable television), a telephone line (including DSL connections), Broadband over Power Line, or even an ordinary VHF or UHF antenna. The STB may have several different embodiments. For example, it may be a special digital STB for delivering digital content on TV sets that do not have a built in digital tuner. The STB may also descramble premium cable channels. A STB may be a cable converter box to receive digital cable TV channels and convert them to analog for non-digital TVs. In the case of direct broadcast satellite (mini-dish) systems such as SES Astra, Dish Network, or DirecTV, the STB is an integrated receiver/decoder (or IRD). In internet packet (IP) TV networks, the STB may be a small computer providing two-way communications on an IP network, and decoding the video streaming media that eliminates the need for any coaxial cabling. The STB may be a discrete unit or its functionality may be incorporated into other components of the user's system such as the monitor, TV, DVR, or personal computer. For example, the STB may be a portable, modular unit (i.e., a personal STB) or it may be integrated into a stationary TV system. The STB may contain one or more digital processors or may use the processing capabilities of the other system components (e.g., TV, DVR, personal computer). Additionally, rather than having its own tuner, the STB may use the tuner of a television (or DVR).

Figure 1B:
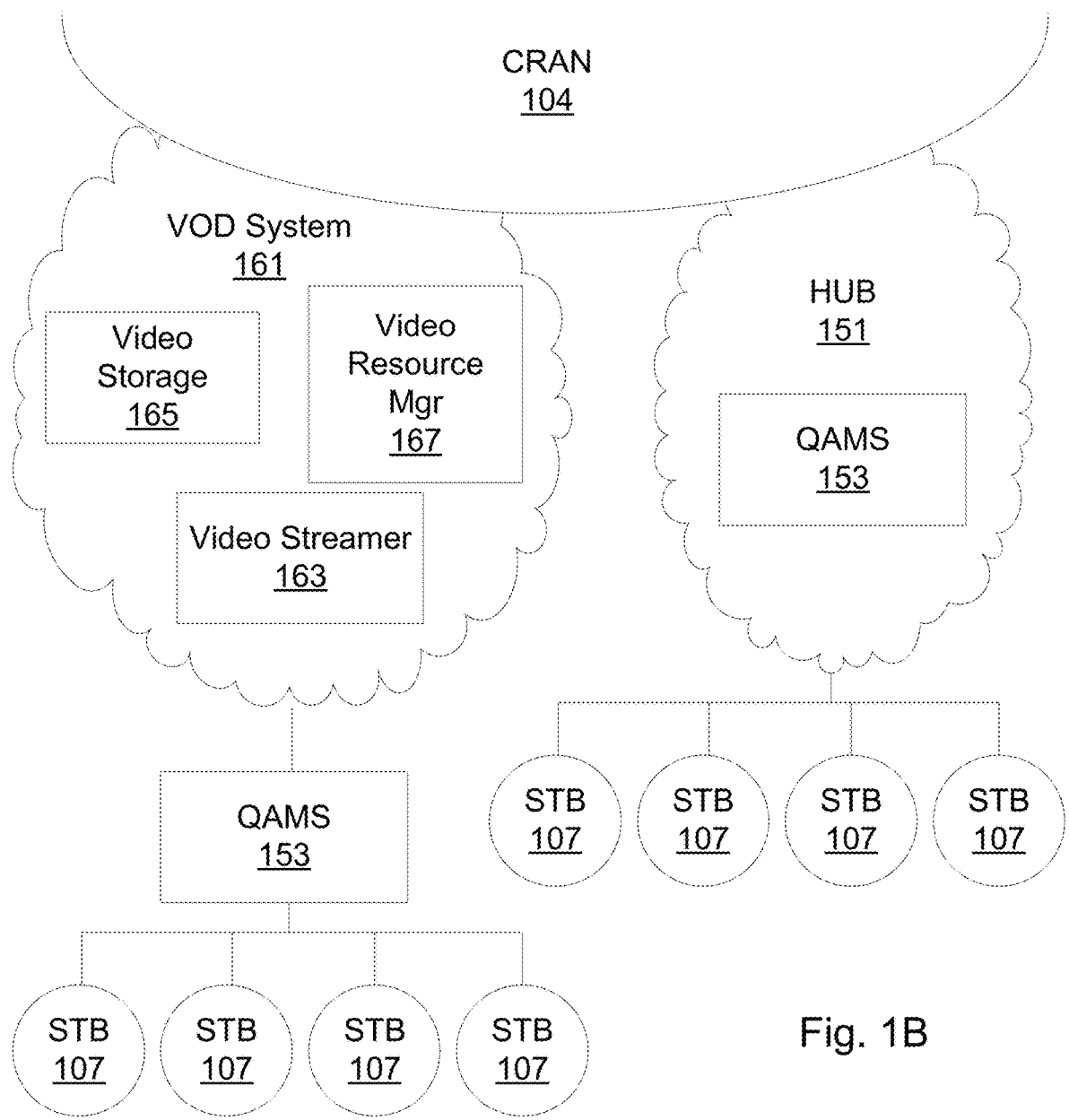
FIG. 1B is another illustrative schematic of a content delivery network in accordance with one or more features of the disclosure herein.

FIG. 1B shows another illustrative schematic of a content delivery network in accordance with one or more features of the disclosure herein. As described above, Converged Regional Area Networks (CRAN) typically, although not necessarily, service certain geographic regions. A CRAN 104 may be associated with one or more networks for communicating with a plurality of clients 107. In the example of FIG. 1B, a hub 151 is shown operatively connected to a CRAN 104. Hub 151 may be some physical location in a cable distribution system. Within a hub 151, one or more quadrature amplitude modulators (QAM) 153 may be included. A QAM 153 may be configured to convey two analog message signals or two digital bit streams by modulating the amplitudes of two carrier waves using an amplitude modulation (AM) scheme. QAMs 153, whether within a hub 151 or associated with a video on demand (VOD) system 161, may be configured to be operatively connected to one or more STBs 107 for transmission and reception of various signals. As further shown in FIG. 1B, a VOD system 161 is shown operatively connected to a CRAN 104. VOD system 161 may include a video streamer 163. Video streamer 163 may be one or more components within a VOD system 161 for transmitting data, such as video and audio content, to one or more QAMs 153. VOD system 161 also may include video storage 165. Video storage 165 may be one or more databases to maintain video content and/or other content. A video resource manager 167 may be included within the VOD system 161 for functionally operating the one or more components of the VOD system 161. Video resource manager 167 may be one or more components operatively connected to one or more other components within the VOD system 161. Features of the present disclosure may be implemented within the illustrative environments of FIG. 1A and/or FIG. 1B.

Figure 2:
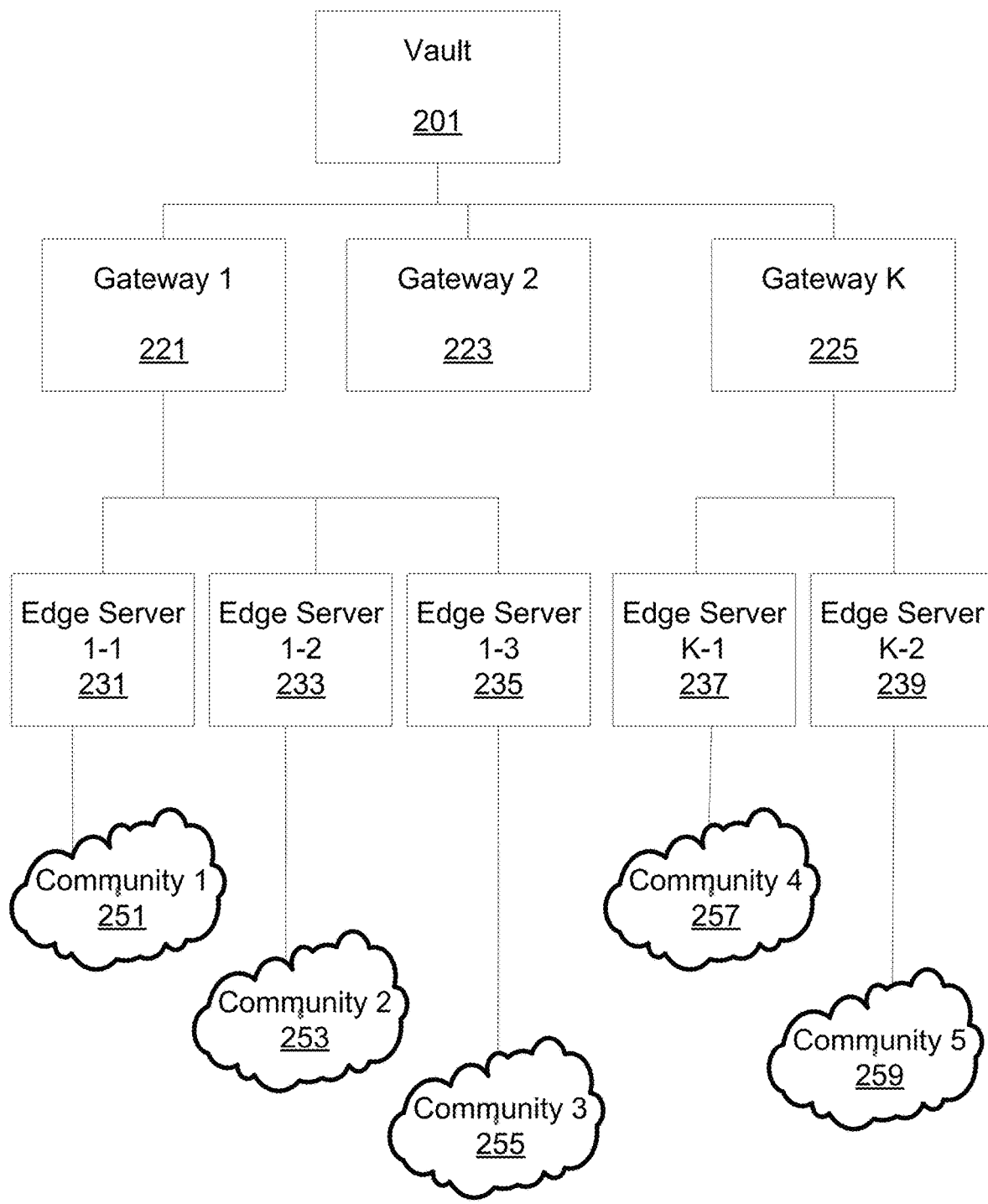
FIG. 2 is an illustrative schematic of a multi tiered content delivery network in accordance with one or more features of the disclosure herein.

FIG. 2 is an illustrative schematic of a multi tiered content delivery network in accordance with one or more features of the disclosure herein. FIG. 2 illustrates an example multi tiered video-on-demand environment in which features of the present disclosure may be implemented and/or included. As shown, a video-on-demand (VOD) content vault 201 is attached to a series of components that manage a unicast delivery of a piece of content from that vault to an end customer device, such as a set-top box (STB) within a community. In the example shown, gateway (1) 221, gateway (2) 223, and gateway (K) 225, are shown operatively connected to the VOD content vault 201. Any of a number of gateways may be included in a system including only one or more than three as shown.

Illustratively shown are three edge servers (1-1) 231, (1-2) 233, and (1-3) 235, operatively connected to gateway (1) 221. Two edge servers (K-1) 237 and (K-2) 239, are shown operatively connected to gateway (K) 225. Again, any of a number of gateways and edge servers may be included in a system described herein. Respective edge servers are shown operatively connected to a community of customer end devices, such as STBs. Edge server (1-1) 231 is operatively connected to community (1) 251, edge server (1-2) 233 is operatively connected to community (2) 253, edge server (1-3) 235 is operatively connected to community (3) 255, edge server (K-1) 237 is operatively connected to community (4) 257, and edge server (K-2) 239 is operatively connected to community (5) 259.

For illustrative purposes, edge servers 231-239 in FIG. 2 may include or be included within CMTS 106 in FIG. 1A. Communities 251-259 in FIG. 2 may include or be included within various STBs 107 operatively connected to the various CMTS 106 in FIG. 1A. Gateways 221-225 in FIG. 2 may include or be included within headends 105 in FIG. 1A and/or CRAN 104 in FIG. 1A. The content vault 201 in FIG. 2 may include or be included within headend 105, CRAN 104, and/or IP network 103 in FIG. 1A. Any of a number of comparable components between the two illustrative diagrams may include one or more features described herein. Features of the present disclosure may be implemented within the illustrative environment of FIG. 2.

Providing search results to a user in a manageable and cost effective manner may alleviate operational strain and cost on a system. Sequencing content, such as VOD, search results by providing a system that consumers may use to narrow content title choices in a large title library in such a way as to encourage choices that already exist at the network edge is described. Such a system reduces incremental resource requirements. In essence, consumers are encouraged to select content which provides for a positive overall use experience while maintaining the integrity of the recommendations.

Features of illustrative system may include a number of various processes. Illustrative processes include evaluation of set-top box (STB) activity, characterization of assets, e.g., pieces of content, within a library/vault of content, and sequencing results of a request. The combination of these three processes provides recommendations in a search result request on a STB by STB basis. The details of these recommendations may alter significantly the resulting title dispersion of viewing requests. The ability to drive these viewing requests in one direction or another may create a material impact on network bandwidth demand in a VOD system built on a multi tiered architecture. As should be understood, an asset may be an entire piece of content as originally maintained and it may be a portion of a piece of content. For example, for a piece of content that is a movie, an asset may be a particular chapter of the movie, it may be the audio portion of the movie, it may be the subtitling data associated with the movie, any portion thereof, and/or any combination of such portions thereof.

The process of evaluating STB activity may include using historical VOD activity for an individual STB to establish and maintain an activity profile for the STB. Such an activity profile may reflect pieces of content, e.g., assets, ordered, type, e.g., high definition, duration of asset, assets ordered, number of times an ordered asset was viewed, percent viewed of an ordered asset, how recent an ordered asset was viewed, and/or other data. Such a profile may be maintained for each STB which has had viewing activity. This profile may be maintained in the respective STB and/or may be maintained in a storage area outside of the STB, such as in an edge router, a CMTS, a headend, a gateway, a CRAN, an IP network, and/or some other location.

The process of characterizing assets within a library/vault of content may include identifying particular attributes of each asset. Attributes may include characteristics such as resolution, i.e., bitrate, (e.g., standard definition (SD) vs. high definition (HD), high resolution vs. low resolution), price for ordering the asset (e.g., free, pay, event), genre of the asset (e.g., action, comedy, documentary), how recent of release of the asset (e.g., new release vs. catalog asset), original distribution popularity, "local" VOD popularity, etc. These attributes may be set for each asset in a library/vault of content. Some attributes may change value over time (e.g., new release vs. catalog asset), so effective dates may be maintained for attributes. Some content may appear over time under different assets (e.g., advertising swaps out, but program remains the same), so an umbrella content identification (ID) may be maintained.

As used herein, the attribute of how recent of release of the asset is understood to mean whether the asset has been available to order prior to some threshold time period. For example, if the asset is a movie and the release date for ordering the movie is January $1^{st}$, the threshold time period may be 6 months. As such, from January $1^{st}$ through June $30^{th}$, that asset may have an attribute of a new release movie. After June $30^{th}$, the asset may have its attribute changed to be a cataloged movie. The threshold time period of 6 months is merely illustrative. Any particular threshold time period may be utilized.

The process of sequencing the results of a search request in accordance with features described herein may be one factor in reducing bandwidth requirements on an overall system. In some systems, collaborative filtering algorithms have been used to create lists in recommending movies, books, etc. In addition to providing the consumer with relevant choices, these recommendation engines are tuned to drive consumer selection away from newly available titles and encourage selection of older titles in order to both further monetize the existing investment in older titles and reduce the investment required to support the short term spike in demand for newly available titles.

In a multi tiered VOD system with a large, geographically distributed asset library, such as a cable system, the objectives may be different. In a cable plant environment, the degree to which asset selection can be concentrated into a small set of assets may impact the bandwidth requirements deeper within the network. Therefore, the objective of recommendations may not be to monetize the catalog assets, but rather to concentrate the viewing requests into a relatively small number of assets so as to leverage the asset storage at the edge of the network and minimize bandwidth demand deeper in the network. In accordance with features described herein, a combination of these processes may be used to drive consumer VOD choice towards content maintained at the edge, which may be new release/high activity content, and away from content not maintained at the edge, which may be low popularity catalog content, minimizing the need for additional bandwidth in a multi tiered VOD delivery environment.

Figure 3:
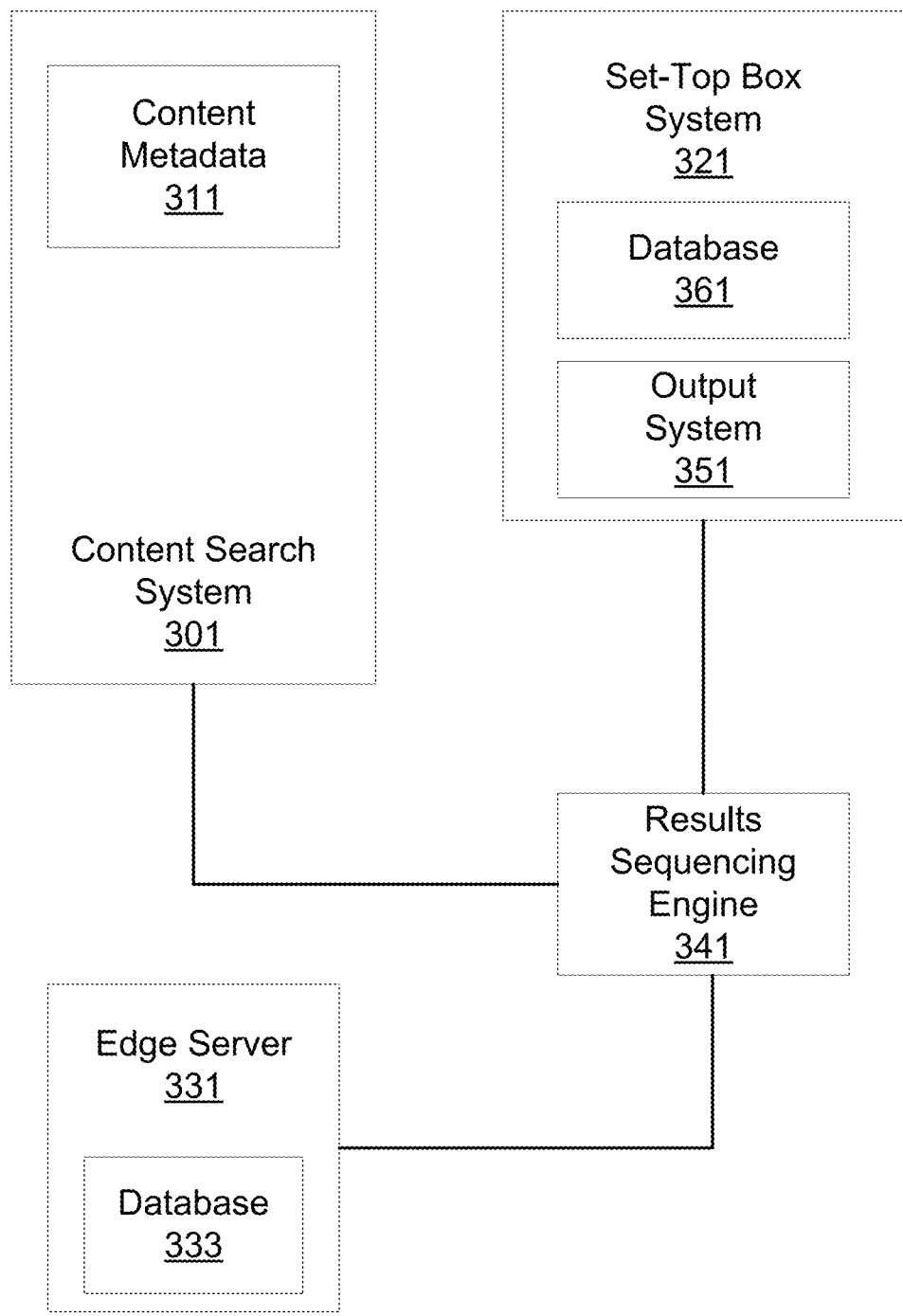
FIG. 3 is an illustrative block diagram of a content delivery system in accordance with one or more features of the disclosure herein.

FIG. 3 is an illustrative block diagram of a content delivery system in accordance with one or more features of the disclosure herein. A content search system 301 is shown. Content search system 301 may be a system configured to maintain a list of all assets associated with a database, such as vault 201 in FIG. 2. The assets in the content search system 301 may have metadata associated with them. The content metadata 311 associated with each asset may be stored within content search system 301 as shown in FIG. 3 and/or may be stored external to content search system 301. Content metadata 311 may include one or more attributes associated with an asset to characterize the asset. Each asset may be characterized by one or more attributes and each asset may not include the same number of attributes as other assets.

Content metadata 311 may include attributes of an asset such as an identification of the asset. Such an identification ID may be a code number associated with the asset for the overall system. Content metadata 311 also may include attributes such as the title of the piece of content, such the title of a movie or name of a song, the resolution of the asset, such as standard definition vs. high definition, the duration of the asset, such as 4 minutes for a song compared to 120 minutes for a movie, and the type of asset, such as movie, television show, music, etc. Still other attributes may include the original release date for the asset, including, e.g., for a movie, the original release date of the movie in a theater and the original release date of the movie for ordering by a user.

Additional attributes may include the genre of the asset, such as action movie, drama movie, comedy movie, and documentary, the price classification to order the asset, such as free, minimum threshold charge, secondary threshold charge, tertiary threshold charge, and maximum threshold charge. Attributes also may include how recent of release of the asset, i.e., whether the asset is considered a new release asset or a catalog asset of the system. As described above, the attribute of how recent of release of the asset is understood to mean whether the asset has been available to order prior to some threshold time period. If prior to the threshold time period, the asset may include an attribute as a new release asset. If at or after the threshold time period, the asset may include an attribute as a catalog asset.

Additional attributes may include the popularity of the original distribution of the asset. For example, a movie that was extremely popular when originally released in movie theaters may have a popularity of the original distribution attribute as high. A movie that was extremely unpopular when originally released in movie theaters may have a popularity of the original distribution attribute as low. As such, as described herein, the overall system may utilize a popularity of the original distribution attribute that is high differently from one that is low. Still other attributes may include local content popularity. For example, a piece of content may find larger attraction based upon a geographic region. A piece of content that is a documentary on a sports franchise, such as the Buffalo Bills™ football team of the National Football League™, may be ordered more often in the western New York area in comparison to just about any other area of the United States. As such, a local content popularity attribute for such an asset may be high with respect to the New York area and low with respect to any other. As described herein, attributes for characterizing an asset may take other forms and the illustrative ones described herein should not be limiting to the present disclosure.

Set-top box system 321 may be a system configured to receive customer inputs, to output pieces of content to a device, such as to a television or computer monitor, and/or to maintain a list of attribute preferences associated with the set-top box (STB), such as STB 107 in FIG. 1A. Features of the set-top box system 321 described herein may also be found and/or performed in other devices within the overall system, such as the network environment shown in FIG. 1A and/or FIG. 2. STB system 321 may be a set-top box at a home of an end user, such as a customer of a cable system. As shown, STB system 321 may include an output system 351. Output system 351 may include a display device, such as a computer monitor and/or a television set.

STB system 321 may include a database 361 for maintaining a list of attribute preferences associated with the STB. An attribute preference may be an active preference selected by a user of the STB. For example, a user may want to block any pieces of content that is not rated at all or has a rating of R, restricted, or higher. Thus, a user can select this type of attribute preference that may be maintained in a database 361. Other active attribute preferences may include, but are not limited to, specific genre exclusions, specific price exclusions, only asset types that are movies, etc.

An attribute preference also may be a passive attribute preference where the system may assign an attribute preference based upon usage by the user, type of STB being used, and/or other data. For example, an attribute preference may be that the user almost always chooses high definition HD movies when ordering a video on demand. As such, a passive attribute preference of HD versions of movies may be associated with the STB system 321. In another example, the STB system 321 may include a STB that is not a HD compatible STB or is connected to an output system 351 that is not a HD television. As such, an attribute preference of SD may be assigned as an attribute preference associated with the STB of the user. Other passive attribute preferences may include, but are not limited to, genre, duration of piece of content, type of piece of content, such as movie vs. television, etc.

These STB attribute preferences may be utilized as described herein as part of the process of evaluating STB activity. The system may use historical usage/ordering activity for an individual STB to establish and maintain an activity profile for the STB. The STB system 321 may be configured to maintain the STB attribute preferences as an activity profile in the database 361.

In another embodiment, an activity profile associated with the STB system 321 may be associated with a particular end user. For example, a household utilizing STB system 321 may include a mother, a father, a grandmother, a teenage girl, and a younger grade school brother. In such a household, STB system 321 may include multiple activity profiles. Each individual in the home may have an individual activity profile. As such, the STB system 321 may maintain different STB attribute preferences for each individual. Some attribute preferences may be the same, whether by choice of the user or of the system, while others may be different. For example, the STB system 321 may have a profile for each individual with an attribute preference of SD for the resolution/bitrate preference since the television associated with the STB is only configured for SD output. In the same example, the mother's attribute preference for genre may be excluding action and horror movies while the father's attribute preference for genre may exclude everything but action movies. Any of a number of different configurations of multiple activity profiles per end viewer may be possible.

Alternatively, the system may be configured to allow an activity profile to be maintained for some individuals in a household, but not all. For example, in the same example of a mother, father, grandmother, and two children, the STB system 321 may be configured to allow for three activity profiles to be created and maintained for the mother, the father, and the grandmother, respectively, while excluding the children from being able to have one. The system may be configured only to allow for creation and maintenance of an activity profile for an individual 18 years of age or older. Such a system may allow an end customer, such as a parent, the freedom to curtail certain or any viewing or ordering of pieces of content by certain individuals, such as his/her children. As should be understood, the age and/or other criteria for an end customer to restrict certain access and/or entire access to features described herein is not limited to the examples described.

FIG. 3 also shows an edge server system 331. Edge server system 331 may include or be included within an edge server, such as edge server (1-1) 231, illustrated in FIG. 2. Edge server system 331 may maintain a partial group of the pieces of content stored in a vault, such as vault 201 in FIG. 2. Edge server system 331 may be configured to maintain a predefined number of pieces of content. This predefined number of pieces of content may be maintained within a cache or other type of storage system. The cache may be configured to change the particular pieces of content in its storage. As such, the cache within edge server 331 may be configured to change based upon any of a number of factors.

In one example, edge server system 331 may be configured to maintain the same listing of pieces of content until a request for a piece of content not stored in the cache is requested by an end user at her STB that is operatively connected to the edge server system 331, such as edge server (1-1) 231 and a STB within community (1) 251 in FIG. 2. Once a request for a piece of content, such as a movie, is made to the edge server system 331 that is not already stored within its associated database/cache 333, the piece of content may be retrieved from a vault, such as vault 201 in FIG. 2, associated with the edge server system. The retrieved piece of content may take the place of another piece of content that is removed from the database 333. The removed piece of content may be removed based upon any of a number of criteria, such as frequency of ordering by end users in its associated community, the price associated with the removed piece of content, the duration of the piece of content, and/or some other criteria. Once stored in the database 333, the requested piece of content may then be forwarded to the requesting STB. Should the same STB or another STB associated with the edge server system 331 want to order the same piece of content, because it is already being maintained in the database 333 at the edge server system 331, the overall system need not spend time and resources obtaining another copy from the associated vault.

The database 333 within edge server system 331 also may be configured to store certain pieces of content that may be expected to be requested in higher volume. For example, movies are often released on DVD, pay-per-view, and video-on-demand on Tuesdays. In anticipation of a large number of STBs in a community wanting to request a particular movie upon its availability, the database 333 of an edge server system 331 may be configured to be loaded with the particular movie prior to a request for the movie. As such, when the movie is made available for requests, the edge server 331 already maintains the movie in its database 333 and again need not spend time and resources obtaining another copy from its associated vault. The database 333 of pieces of content in the edge server system 331 may be configured to include metadata associated with the piece of content that may identify the pieces of content by title, asset code, genre, duration, resolution, type of piece of content, number of times requested, and/or other parameters.

FIG. 3 also shows a results sequencing engine 341. Results sequencing engine 341 may be configured to be operatively connected to a STB system 321, content search system 301, and edge server system 331. Results sequencing engine 341 may be utilized to sequence the results of a search request from an end customer at a STB. The sequencing of the search results in accordance with features described herein may be one factor in reducing bandwidth requirements on an overall system. In a multi tiered content distribution system with a large, geographically distributed asset library, such as a cable system, the degree to which asset selection can be concentrated into a small set of assets may impact the bandwidth requirements deeper within the network.

As described herein, the results sequencing engine 341 may be configured to provide sequenced recommendations to concentrate the viewing requests into a relatively small number of assets so as to leverage the asset storage at the edge of the network, e.g., the database 333 in edge server system 331, and minimize bandwidth demand deeper in the network, e.g., through gateways and other components back to a vault, such as vault 201 in FIG. 2. Results sequencing engine 341 may be used to drive consumer content choice towards new release/high activity content or currently stored content within database 333 and away from low popularity catalog content stored within a vault but not stored within database 333, minimizing the need for additional bandwidth in a multi tiered content delivery environment.

Results sequencing engine 341 may be configured to utilize data from content search system 301, STB system 321, and edge server system 331 in order to provide a sequenced results list to a user. As described herein, a user of a STB system 321 associated with an edge server system 331 may want to search for a piece of content. Sometimes a user has a particular piece of content in mind, such as a particular movie she wants to see. In other cases, a user may want to search by some criteria or even generally. Utilizing her STB system 321, a user may enter a request for a listing of titles of assets fitting her search request.

As described herein, a results sequencing engine 341 may be configured to provide the requested results in a sequenced manner that places recommendations of pieces of content fitting the request that are already stored in a database 333 at an edge server 331 associated with the STB system 321 before pieces of content fitting the request that are not already stored in the database 333. As such, the system provides recommendations that require less system resources. Results sequencing engine 341 may be configured to utilize a request of a user for search results, data from a content search engine 301, and data from an edge server system 331 to provide a sequenced search results listing to the user.

Figure 4:
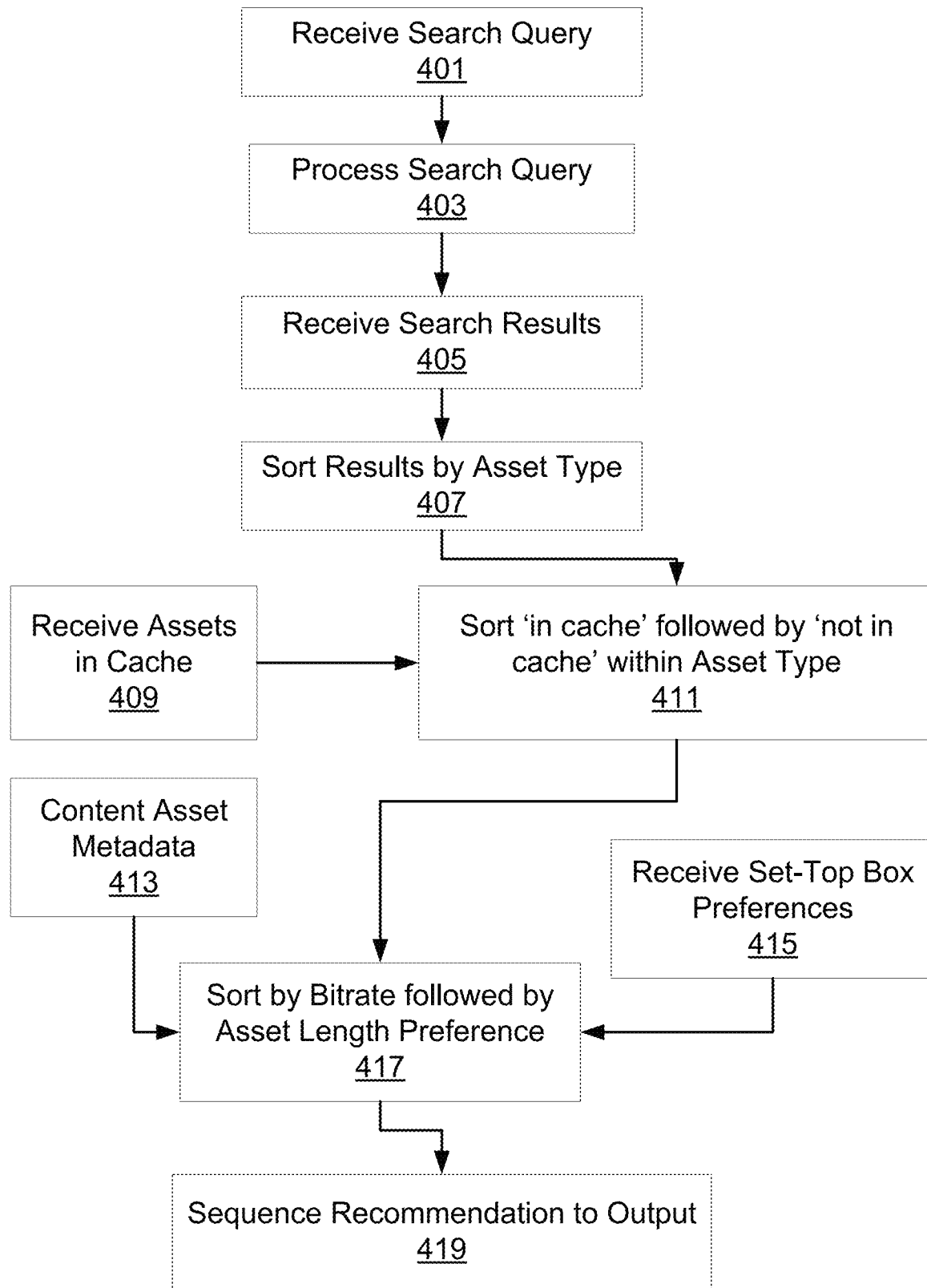
FIG. 4 is an illustrative method for delivering sequences content in accordance with one or more features of the disclosure herein.

FIG. 4 is an illustrative method for delivering sequenced content in accordance with one or more features of the disclosure herein. The process starts at step 401 where a search query from an end user at a STB may be received. The search query may be a request for some results based upon an entered or selected criteria and/or may be a request for all potential pieces of content that may be accessed. For example, the criteria may be by movies that the user could order as opposed to television shows, local event information, or music videos. Step 401 may be applicable to data stored and/or received from a STB system 321 in FIG. 3. In step 403, the search query may be processed and initial search results may be received. Step 403 may be applicable to data stored and/or received from a content search system 301 in FIG. 3. Proceeding to step 405, the search results may be received. These search results may be all applicable results to the request of the user. As described herein, a results sequencing engine, such as results sequencing engine 341 in FIG. 3 may be utilized in receiving the search results.

Moving to step 407, the search results from step 405 may be sorted initially according to one or more attributes. In the example shown in FIG. 4, the search results may be sorted initially by an asset type attribute. An asset type attribute may be an attribute associated with an asset to identify the asset, or piece of content, as a movie, a television show or segment, a music video, a personal video, or some other designation. As should be understood, the initial sorting by an attribute, such as an asset type attribute, need not necessarily occur and that the example in FIG. 4 is but one illustrative example.

In step 409, the system may receive a listing of the assets currently being maintained in a database of an edge server associated with the requesting STB. Step 409 may be applicable to data stored and/or received from a database 333 in an edge server system 331 in FIG. 3. Step 409 may include receiving additional metadata associated with the pieces of content stored within a database within the edge server, such as genre attributes, resolution/bitrate attributes, language attributes, etc. At step 411, the received listing of assets in a database of an associated edge server may be utilized by the system to sort the results from step 407.

For example, the result of the sorting in step 407 may have a total of fifty (50) possible recommendations and the listing of assets in the database of the edge server may indicate that twenty (20) of the 50 recommendations are already stored within the database and that the other thirty (30) possible recommendations are not. In receiving the listing of assets in the database of the associated edge server in step 409, the system may resort the listing of 50 possible recommendations. The system may be configured to resort the listing of 50 possible recommendations to rank the 20 assets of the 50 possible recommendations that are in the database of the edge server as "in cache" or higher in the resulting listing compared to those not within the database as "not in cache." As such, a resulting listing of possible recommendations from step 411 may find a listing with those assets already stored within the database associated with the edge server of the STB at the top of the resulting listing in comparison to those not in the database. As described herein, a results sequencing engine, such as results sequencing engine 341 in FIG. 3 may be utilized in sorting the search results in step 411.

In step 413, the system may receive metadata associated with the content assets of the listing of assets from the listing in step 411. Such data may include, but is not limited to, any or all attributes maintained with respect to the assets including, but not limited to, genre, resolution/bitrate, asset length, original release of asset, language of asset, and price class of asset. Step 413 may be applicable to data stored and/or received from a content metadata 311 from a content search system 301 as shown in FIG. 3. Concurrently, at step 415, the system may receive data regarding attribute preferences associated with a STB of the requesting user. As previously described, the STB attribute preferences may include an activity profile associated with an individual user and/or the STB itself. Such data may include, but is not limited to, any or all attributes maintained with respect to an individual and/or the requesting STB including, but not limited to, genre, resolution/bitrate, asset length, original release of asset, language of asset, and price class of asset. Step 415 may be applicable to data stored and/or received from a database 361 from a STB system 321 as shown in FIG. 3.

At step 417, the data from step 413 and step 415 may be utilized by the system to sort the resultant listing of recommendations from step 411. As described herein, a results sequencing engine, such as results sequencing engine 341 in FIG. 3 may be utilized in sorting the search results in step 417. For example, the result of the sorting in step 411 may have the total of fifty (50) possible recommendations first sorted by asset type and then sorted and sequenced with the 20 assets stored in an associated edge server first followed by recommendations meeting the initial request of the user that are not currently stored in the edge server database. In receiving the data in steps 413 and 415, the system may resort the listing of possible recommendations from step 411. The system may be configured to resort the listing from step 411 to rank the assets by one or more of the STB preferences received from step 415 while maintaining the delineation between "in cache" and "not in cache" recommendations.

For example, continuing from the previous example, the system may determine that of the 20 "in cache" recommendations, twelve (12) include attributes that match the STB attribute preferences received from step 415. As such, a resulting listing of possible recommendations from step 417 may find a listing by the STB attribute preferences, such as resolution/bitrate and asset length, so the first 12 assets that are recommended are the 12 that match the STB preferences and that are already stored within the associated edge server. The next 8 recommendations listed may be the other 8 assets that are stored in the edge server but that don't match the STB attribute preferences. The next group of recommendations may be those assets with an attribute of "not in cache", i.e., not currently stored in the associated edge server and an attribute(s) that matches the STB attribute preferences. The final group of recommendations then may be those assets with an attribute of "not in cache" not currently stored in the associated edge server and with an attribute(s) that doesn't match the STB attribute preferences.

Proceeding to step 419, the sequenced recommendation list from step 417 may be received by the STB of the requesting user. The sequenced list may be provided to an output system associated with the STB, such as output system 351 associated with STB system 321 shown in FIG. 3. The outputted sequenced list of recommendations may then be further reviewed by the user in order to choose a particular piece of content for ordering and/or further queried for a narrower search. In accordance with features herein, an edge server associated with a STB may include advertisement data representative of one or more advertisements. Alternatively and/or concurrently, other devices within the overall system may include advertisement data representative of one or more advertisements. The advertisement data may be updated within the edge server and/or other devices at different intervals than the pieces of content, e.g., assets. Advertisement data may be updated within a device periodically, such as every two (2) or six (6) weeks while the pieces of content for ordering by a user only may be updated when new pieces of content need to be retrieved from a content provider, such as a vault. When outputting the results of the search request with a sequenced listing of recommendations for ordering, the system may be configured to include one or more advertisements associated with the advertisement data.

Figure 5C:
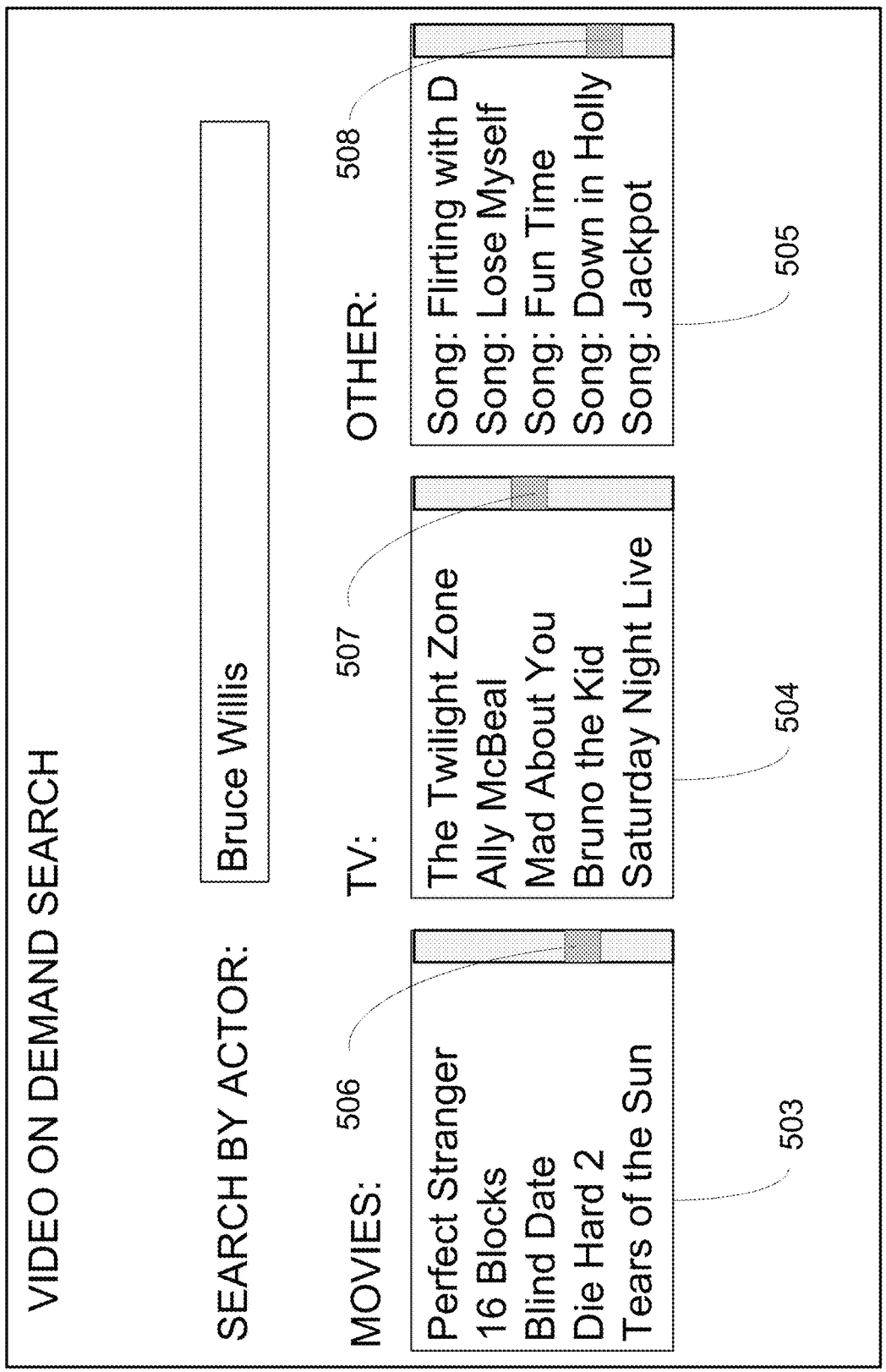

FIGS. 5A-5C are illustrative user interfaces of a sequenced content delivery system in accordance with one or more features of the disclosure herein. As should be understood, the images shown in FIGS. 5A-5C are merely illustrative of one possible sequence in accordance of features described herein and that the present disclosure is not so limited to the example provided. FIG. 5A is illustrative of an example video on demand search user interface 500A that a user of a STB may utilize when desiring to potentially order a piece of content from her cable provider. The user interface may be displayed on a television, a monitor associated with a computer, and/or some other electronic device. The user interface 500A may be displayed on output system 351 associated with a STB system 321 of the user shown in FIG. 3.

User interface 500A shows a search parameter 501 that may be initially shown and/or may be shown after an initial search parameter is chosen by the user. For example, a user interface previous to user interface 500A may have categories for a user to choose from and the user chose to search by actor. Any of a number of initial search categories may be chosen including, but not limited to, search by type of piece of content, search by actor/actress, search by director, search by genre, search by parental rating, search by singer, search by language, and/or other categories. Upon accessing user interface 500A, the user may be prompted to enter a search query in field 502 corresponding to the initial search parameter 501 chosen. In this example, the initial search parameter 501 chosen was search by actor and the user is prompted to enter a name into field 502. As should be understood, any of a number of manners may be provided for a user to be able to enter data into a field 502 including, but not limited to, a keyboard, a remote control, one or more drop down boxes, and/or some other manner known in the art. In the example provided, the user has entered "Bruce Willis" into field 502.

Upon entering "Bruce Willis" into field 502, the user interface may transition to the image shown in FIG. 5B. In FIG. 5B, user interface 500B shows the results of a search performed on the search query of "Bruce Willis" in accordance with the features described herein. The sequenced search results for the entry of "Bruce Willis" in user interface 500B may be obtained in accordance with the example method of FIG. 4. As shown, the recommendations that match the search query of "Bruce Willis" are shown divided by the type of asset, e.g., movie, television show or segment, and other, which may include music, such as is described with respect to step 407 in FIG. 4. The divided fields of recommendations are shown corresponding to movies 503 that include the actor "Bruce Willis," television shows or segments 504 that include the actor "Bruce Willis," and other 505 pieces of content that include the actor "Bruce Willis." The order of the recommendations in each asset type further may be based upon whether the assets that match "Bruce Willis" are currently stored in a database of an edge server associated with the STB of the user, such as is described in step 411 of FIG. 4. In addition, the order of the recommendations in each asset type may be based upon the STB attribute preferences of the requesting user that entered "Bruce Willis" as the search query, such as is described with respect to step 417 in FIG. 4. This final sequenced listing of assets that are recommended to the user based upon her search query of "Bruce Willis" in user interface 500B may correspond to step 419 as shown in FIG. 4.

The difference between user interface 500B and 500C shown in FIG. 5C may be that the user has scrolled down one or more portions of the outputted fields 503-505 of the search recommendation list outputted to her. In user interface 500B, the top recommendations for each asset type may match the STB attribute preferences of the user and the assets that are currently stored within the associated edge server of the STB of the user. As such, if one of the assets at or near the top of a list is chosen, the system does not need to use network resources deep within the network. The system only may need to access the content from the associated edge server since it is currently maintained at that location.

In user interface 500C shown in FIG. 5C, the user has scrolled down the fields 503-505. In this case, the user has scrolled down using one or more of the scroll bars 506, 507, or 508 associated with fields 503, 504, and 505, respectively. As should be understood, the use of scroll bars is but one manner for moving higher or lower within a listing of recommendations per asset type and that any of a number of other manners may be utilized in place. In FIG. 5C, the assets shown in fields 503, 504, and/or 505, may be recommendations that match the search query of "Bruce Willis," but are shown further down the list of recommendations since the assets may not be maintained currently within a database of an edge server associated with the STB of the user. As such, the user may be encouraged to select an asset higher in the list, as shown in FIG. 5B in comparison to an asset further down the list, as shown in FIG. 5C.

Figure 6:
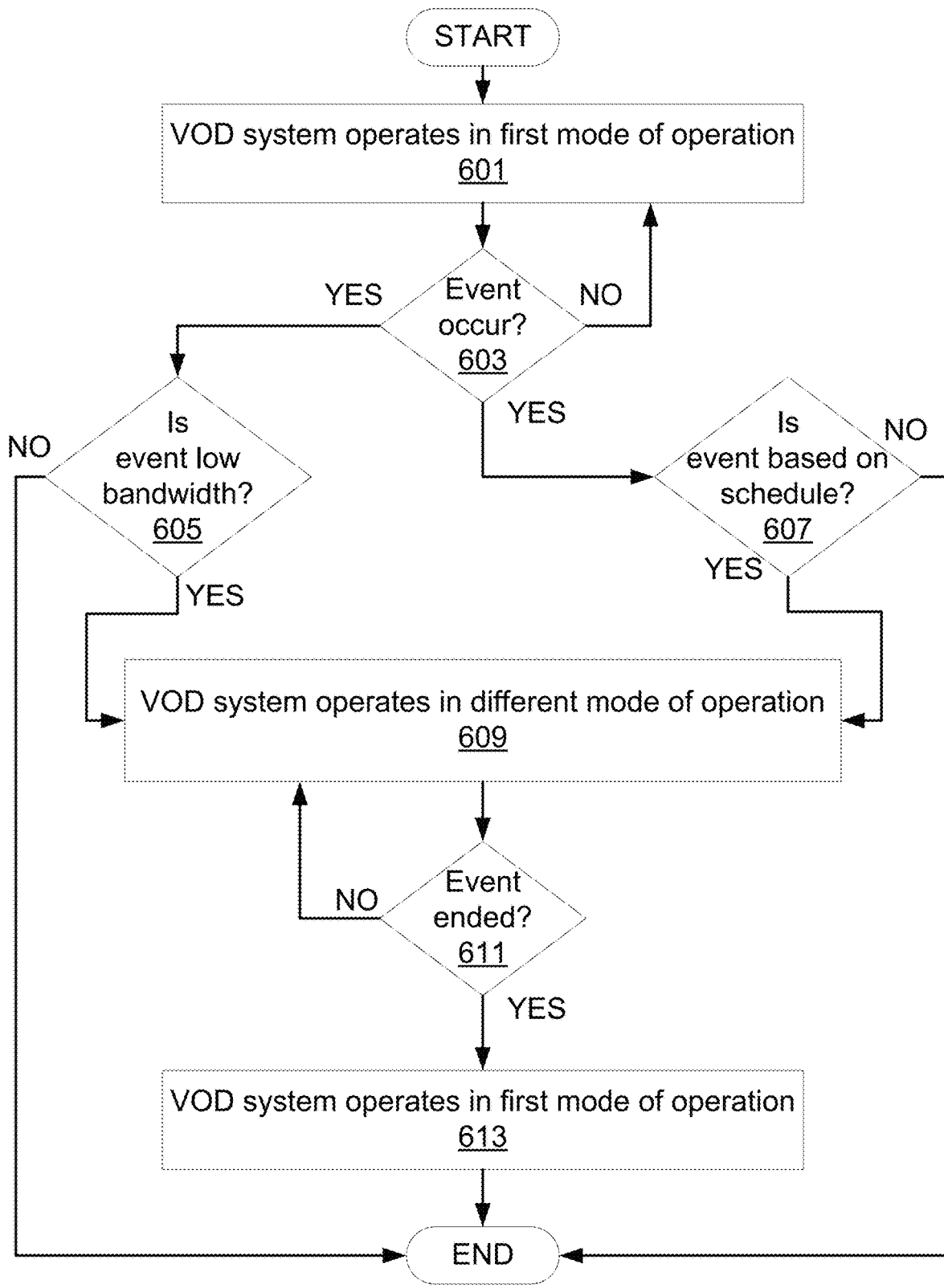
FIG. 6 is another illustrative method for delivering sequences content in accordance with one or more features of the disclosure herein.

FIG. 6 shows another illustrative method for delivering sequenced content in accordance with one or more features of the disclosure herein. Features of outputting a sequenced listing of assets to an end user as described herein may be implemented at all times within a system or may be implemented at certain times. For example, an event may occur to cause operation of a system from a first mode of operation to a different mode of operation. One of the modes may include features described herein to encourage end customers to select assets locally at an associated edge server servicing the end customer. Another mode may be to randomly provide a listing of assets without implementation of one or more features described herein. FIG. 6 illustrates an example method for event triggered implementation of features of the present disclosure described herein.

The process starts and at step 601, a video on demand (VOD) system operates in a first mode of operation. Such a first mode of operation may include providing a listing of assets of the VOD system that meet a search criteria of the end user without sequencing the listing by assets maintained at an edge server servicing the end user as described herein. Proceeding to step 603, a determination may be made as to whether an event has occurred to trigger operation in a different mode. If no event has occurred, the VOD system continues to operate in a first mode of operation. If an event does occur in step 603, the process continues to steps 605 and 607. As should be understood, although the process shown in FIG. 6 is one illustrative method where events are determined concurrently, alternative method may be included herein where each type of event is determined and, if one is found to occur, no other determination of the type of event is needed. In still other methods understood herein, other types of events beyond those described in FIG. 6 may occur and the present disclosure is not limited to the examples provided.

In step 605, a determination may be made as to whether the event that has occurred is a low bandwidth event, e.g., an unscheduled event. Such an event may occur when the VOD system is experiencing high usage by many end users. The VOD system may include one or more components for determining bandwidth on the system and, when a threshold level is reached, the event corresponding to a low bandwidth event may be triggered. If the event is not a low bandwidth event in step 605, the process may end. If the event is a low bandwidth event, the process proceeds to step 609.

In step 607, a determination may be made as to whether the event that has occurred is based on a schedule, i.e., a scheduled event. Such an event may occur when the VOD system is expecting high usage by many end users or when a new piece of content is released and demand to access the content is expected to be high. The VOD system may include one or more components for maintaining one or more schedules associated with the system and, when the schedule dictates such as due to a particular time, the event corresponding to being based on a schedule may be triggered. If the event is not based on a schedule in step 607, the process may end. If the event is based on a schedule, the process proceeds to step 609.

In step 609, the VOD system changes to operate in a different mode of operation from the first mode of operation. The different mode of operation may be the same for any type of event or there may be many different modes of operation from the first mode of operation. Each type of event may trigger a different mode of operation, any type of event may trigger one different mode of operation, or certain events may trigger one different mode of operation from the first mode while other certain events may trigger one or more other different modes of operation from the first mode and the one different mode.

In the example of FIG. 6, the different mode of operation may include the sequenced listing of assets to an end user as described herein. As such, if the VOD system is experiencing high usage with low bandwidth, as in step 605, it may be desirable to implement the features described herein for a sequenced listing of assets that are maintained at an edge server servicing the end user.

The VOD system may operate in the different mode of operation until the event has ended. If determined that the event has not ended in step 611, the process proceeds back to step 609 to continue operation in the different mode of operation. If determined that the event has ended in step 611, the process proceeds to step 613 where the VOD system changes to return to operation in the first mode of operation. As should be understood, from step 609, the process may proceed back to step 603 to see if another event has occurred. Thus, if while operating in a different mode of operation in step 609 another event occurs, the process may proceed to have the VOD system change to operate in another mode of operation that is different from the first mode of operation in step 601 and the different mode of operation in step 609.

Other embodiments include numerous variations on the devices and techniques described above. Embodiments of the disclosure include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause one or more devices to carry out operations such as are described herein. As used herein (including the claims), a machine-readable storage medium is a physical structure that can be touched by a human. A modulated signal would not by itself constitute a machine-readable storage medium.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present disclosure in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the disclosure.

The invention claimed is:

1. A method comprising:
receiving, by one or more computing devices, a search request associated with an edge server in a content delivery network, the search request comprising one or more search criteria;
determining, by the one or more computing devices, search results comprising a plurality of assets responsive to the one or more search criteria in the search request;
determining, by the one or more computing devices and based on a current bandwidth usage of the content delivery network, that one or more additional criteria are to be applied to the search results, wherein the one or more additional criteria comprise, for each asset of the plurality of assets, an indication of whether that asset is stored on the edge server;
based on the determining that the one or more additional criteria are to be applied to the search results, generating a list of ranked search results by sorting the search results according to the one or more additional criteria; and
transmitting the list of ranked search results to a user device.

2. The method of claim 1, further comprising receiving advertisement data representative of one or more advertisements stored by the edge server, wherein the generating the list of ranked search results comprises generating the list of ranked search results and at least one advertisement associated with the advertisement data.

3. The method of claim 1, wherein the sorting comprises determining a first sub-group comprising one or more assets, of the plurality of assets, that are stored by the edge server and a second sub-group comprising one or more assets, of the plurality of assets, that are not stored by the edge server, and wherein the list of ranked search results comprises a delineation between the first sub-group and the second sub-group.

4. The method of claim 3, wherein generating the list of ranked search results comprises ranking the first sub-group higher than the second sub-group in the list of ranked search results.

5. The method of claim 3, further comprising:
receiving first data and second data, the first data representative of attribute metadata associated with each of the plurality of assets and the second data representative of at least one attribute preference associated with a user;
ranking each of the one or more assets in the first sub-group according to the first data and the second data;
ranking each of the one or more assets in the second sub-group according to the first data and the second data; and
maintaining, in the list of ranked search results, the delineation between the first sub-group and the second sub-group.

6. The method of claim 5, wherein the at least one attribute preference comprises one or more of: a type of asset, a genre, or a resolution.

7. The method of claim 1, wherein the one or more search criteria comprise at least an asset type.

8. The method of claim 7, further comprising determining, for the asset type, a first sub-group comprising a plurality of assets, of the asset type, that are stored by the edge server and a second sub-group comprising a plurality of assets, of the asset type, that are not stored by the edge server.

9. The method of claim 8, further comprising ranking, for the asset type, the first sub-group higher than the second sub-group in the list of ranked search results.

10. A system comprising:
a first computing device comprising:
one or more processors; and
memory storing instructions that, when executed by the one or more processors, cause the first computing device to:
receive a search request associated with an edge server in a content delivery network, the search request comprising one or more criteria;
produce search results comprising a plurality of assets in response to the one or more criteria in the search request;
determine, based on a current bandwidth availability of the content delivery network, that an additional criterion is to be applied to the search results; and based on the determining that the additional criterion is to be applied to the search results, apply the additional criterion to the search results by sorting the plurality of assets into a first sub-group and a second sub-group, the first sub-group comprising a plurality of assets that are stored on the edge server and the second sub-group comprising a plurality of assets that are not stored on the edge server;

generating a list of ranked search results by ranking the first sub-group higher than the second sub-group; and transmitting the list of ranked search results to a user device; and the user device, wherein the user device receives the list of ranked search results.

11. The system of claim 10, wherein the first computing device is further configured to receive data representative of at least one attribute preference associated with a user and sort the first sub-group and the second sub-group based upon the data representative of at least one attribute preference associated with the user.

12. The system of claim 10, wherein the first computing device is further configured to receive data representative of attribute metadata associated with at least one of the plurality of assets and data representative of at least one attribute preference associated with a user, and sort the first sub-group and the second sub-group based upon the data representative of at least one attribute preference associated with the user and the data representative of attribute metadata associated with at least one of the plurality of assets.

13. The system of claim 10, wherein the first computing device is further configured to receive advertisement data representative of one or more advertisements stored within the edge server, and wherein the generating comprises generating the list of ranked search results and at least one advertisement associated with the advertisement data.

14. The system of claim 10, wherein the list of ranked search results comprises a delineation between the first sub-group and the second sub-group.

15. One or more non-transitory computer-readable media comprising computer-executable instructions that, when executed by one or more processors, cause the one or more processors to:

receive a search request associated with an edge server in a content delivery network;

determine, based on the search request, search results comprising a plurality of assets selected based on one or more criteria of the search request;

determine, based on bandwidth of the content delivery network, that the search results are to be sorted by a second criterion, wherein the second criterion comprises, for each asset of the plurality of assets, an indication of whether that asset is stored on the edge server;

based on determining that the search results are to be sorted by the second criterion, sort the search results by the second criterion; and transmit the search results to a user device.

16. The one or more non-transitory computer-readable media of claim 15, wherein the one or more criteria comprise data representative of at least one attribute preference associated with a user.

17. The one or more non-transitory computer-readable media of claim 16, wherein the one or more criteria further comprise data representative of attribute metadata associated with at least one of the plurality of assets.

18. The one or more non-transitory computer-readable media of claim 17, wherein the sorting the search results by the second criterion comprises determining a first sub-group comprising assets, of the plurality of assets, that are stored on the edge server and a second sub-group comprising assets, of the plurality of assets, that are not stored on the edge server.

19. The one or more non-transitory computer-readable media of claim 18, wherein the sorting by the second criterion further comprises ranking the first sub-group higher than the second sub-group.

20. The one or more non-transitory computer-readable media of claim 16, wherein the at least one attribute preference comprises one or more of: a type of asset, a genre, or a resolution.

* * * * *

UNITED STATES PATENT AND TRADEMARK OFFICE
CERTIFICATE OF CORRECTION

PATENT NO. : 11,144,969 B2
APPLICATION NO. : 12/510733
DATED : October 12, 2021
INVENTOR(S) : Brown Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this
Twenty-fifth Day of February, 2025

Coke Morgan Stewart
*Acting Director of the United States Patent and Trademark Office*